(12) United States Patent
Briggs

(10) Patent No.: US 9,434,039 B2
(45) Date of Patent: Sep. 6, 2016

(54) DRILL PRESS WITH AN ADJUSTABLE GIB

(71) Applicant: C. & E. Fein GmbH, Schwaebish Gmuend-Bargau (DE)

(72) Inventor: Edward L. Briggs, Goose Lake, IA (US)

(73) Assignee: C. & E. Fein GmbH (DE)

( * ) Notice: Subject to any disclaimer, the term of this patent is extended or adjusted under 35 U.S.C. 154(b) by 709 days.

(21) Appl. No.: 13/892,627

(22) Filed: May 13, 2013

(65) Prior Publication Data

US 2013/0306340 A1 Nov. 21, 2013

Related U.S. Application Data

(60) Provisional application No. 61/647,746, filed on May 16, 2012.

(51) Int. Cl.
B23Q 9/02 (2006.01)
B23Q 5/32 (2006.01)

(52) U.S. Cl.
CPC .................................. B23Q 5/32 (2013.01)

(58) Field of Classification Search
CPC ........ B23Q 9/00; B23Q 9/0064; B23Q 9/02; B23Q 5/32
USPC ............... 173/40, 42, 44, 190; 248/637, 646
See application file for complete search history.

(56) References Cited

U.S. PATENT DOCUMENTS

| | | | | | |
|---|---|---|---|---|---|
| 2,160,274 | A | * | 5/1939 | Lopez | B25H 1/0078 408/112 |
| 3,951,216 | A | * | 4/1976 | Crawshay | E21B 19/086 173/156 |
| 4,234,155 | A | * | 11/1980 | Destree | B25D 17/28 173/190 |
| 4,261,673 | A | * | 4/1981 | Hougen | B23Q 9/0014 408/135 |
| 4,413,686 | A | * | 11/1983 | Sundberg | B21J 13/03 173/126 |
| 4,561,506 | A | * | 12/1985 | Booker | B25J 9/146 173/190 |
| 4,809,788 | A | * | 3/1989 | Nelson | E21B 7/02 173/28 |
| 5,435,517 | A | * | 7/1995 | McGuire | F16C 35/12 248/637 |
| 6,102,633 | A | | 8/2000 | Uehlein-Proctor | |
| 6,357,100 | B2 | * | 3/2002 | Speller, Jr. | B21J 15/26 173/149 |
| 6,543,121 | B2 | * | 4/2003 | Speller, Jr. | B21J 15/26 173/149 |
| 7,360,973 | B2 | * | 4/2008 | Turner | B23B 47/281 408/103 |
| 7,396,194 | B2 | * | 7/2008 | Jones, III | B25H 1/0064 248/646 |
| 7,757,780 | B2 | * | 7/2010 | Pollock | E02F 3/06 172/25 |
| 7,766,300 | B2 | * | 8/2010 | Hamann | B23Q 1/0054 248/637 |
| 7,832,496 | B2 | * | 11/2010 | Nakayabu | B23B 41/02 173/184 |
| 8,231,045 | B2 | * | 7/2012 | Lagerkvist | B23K 37/0229 219/124.1 |
| 9,233,423 | B2 | * | 1/2016 | Johnson | B23Q 5/326 |
| 9,242,367 | B2 | * | 1/2016 | Timmons | B25H 1/0071 |
| 2009/0028653 | A1 | * | 1/2009 | Wilbert | B25H 1/0071 408/76 |
| 2009/0261231 | A1 | * | 10/2009 | Martin | B23B 45/04 248/674 |
| 2012/0043100 | A1 | * | 2/2012 | Isobe | A61B 17/1631 173/42 |

* cited by examiner

*Primary Examiner* — Gloria R Weeks
(74) *Attorney, Agent, or Firm* — Jason R. Sytsma; Shuttleworth & Ingersoll, PLC

(57) ABSTRACT

A power tool has a base for supporting the power tool on a surface. A frame is supported on the base and includes a track that extends longitudinally along the frame. A fixed gib is attached to one side of the frame and a movable gib is attached to the other side of the frame. The movable gib can move with respect to the frame. A slide is positioned between the fixed gib and the movable gib for longitudinal movement with respect to frame and is constrained from lateral movement by the fixed gib and the movable gib.

20 Claims, 7 Drawing Sheets

DRILL PRESS WITH AN ADJUSTABLE GIB

This application claims priority to U.S. Provisional Patent Application No. 61/647,746 filed on May 16, 2012, the contents of which are incorporated by reference herein.

A drilling machine is provided. More specifically, a drilling machine with an adjustable gib assembly is disclosed, which increases the ease and speed at which the drilling machine can be adjusted.

BACKGROUND

A conventional drill press generally includes a frame that is supported by a base, and a motor assembly that drives a rotating spindle. The spindle supports a drill bit. Generally, the motor assembly and the spindle are supported on the frame by a feed system, such as a rack and pinion assembly, so that the motor assembly and the spindle are movable in the longitudinal direction relative to the frame and constrained from lateral movement by a gib.

SUMMARY

A power tool is provided. The power tool has a base for supporting the power tool on a surface. A frame is supported on the base and includes a track that extends longitudinally along the frame. A fixed gib is attached to one side of the frame and a movable gib is attached to the other side of the frame. The movable gib can move with respect to the frame. A slide is positioned between the fixed gib and the movable gib for longitudinal movement with respect to frame and is constrained from lateral movement by the fixed gib and the movable gib.

DETAILED DESCRIPTION OF THE ILLUSTRATED EMBODIMENT

Figure 1:
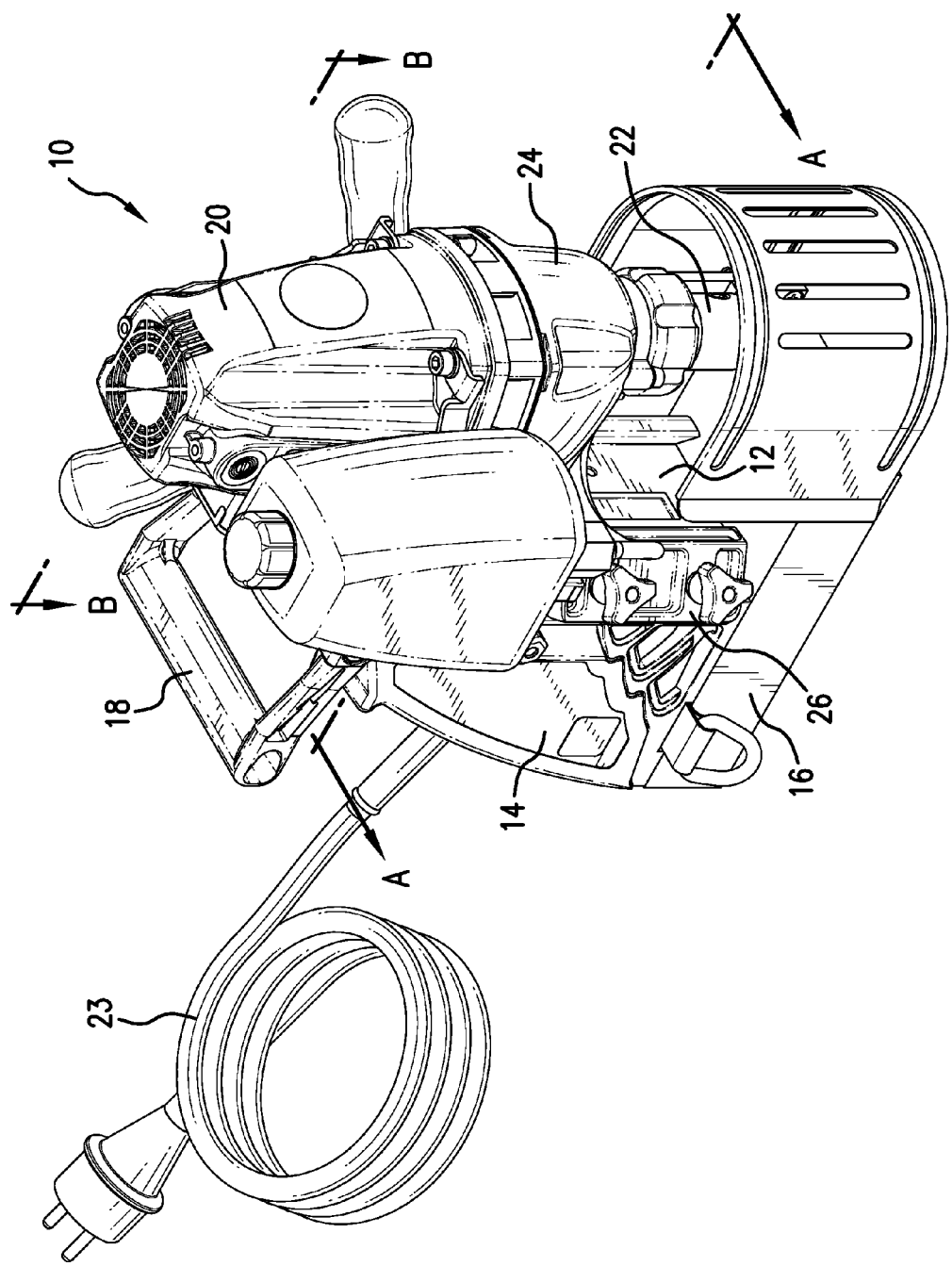
FIG. 1 is a perspective view of a portable drilling machine made in accordance with the principles of the present invention.

FIG. 1 shows a power tool, such as a drill press 10, embodying the present invention. The drill press 10 generally includes a frame 12 and a housing 14 supported by a base 16. The base 16 includes an electromagnet for connecting the base 16 to the surface of a ferromagnetic work piece. In the illustrated embodiment, the drill press 10 is a portable drill press, and includes a carrying handle 18 which attaches to frame 12, to assist the operator in moving the drill press 10 from work piece to work piece. However, it should be understood that the power tool could be a non-portable drill press in which the base is supported on the floor of a work area and which includes a support surface for supporting the work piece.

The drill press 10 includes an electric motor contained within a motor enclosure 20, and a gear housing 24 which is fixed to a dovetail slide 38 that is supported by the frame 12. The motor rotatably drives a spindle assembly 22 about an axis. The motor is powered by a suitable power source connected by a power cord 23. In the illustrated embodiment, the power is further transmitted to the motor through a motor cord 52, which extends from the motor through a cord channel 50 (see FIG. 2) between frame 12 and dovetail slide 38 that supports the motor so that there are no external cords between the control panel on housing 14 and the motor, as taught in U.S. Pat. No. 5,415,503 titled Portable Drilling Machine with Internal Motor Control Cord, the contents of which is incorporated herein by reference. The spindle assembly 22 includes a drive end 25, shown in FIG. 3, engaged by a gear assembly 29 and connected to the motor for driving the spindle assembly 22.

As is well known to those skilled in the art, a tool holder or chuck is supported on, or is an integral part of the lower end of the spindle assembly 22. The chuck supports a drill bit so that the drill bit rotates with the spindle assembly 22. The drill bit moves with spindle assembly 22 along the axis so that the drill bit is movable into engagement with the work piece and out of engagement with the work piece.

Figure 3:
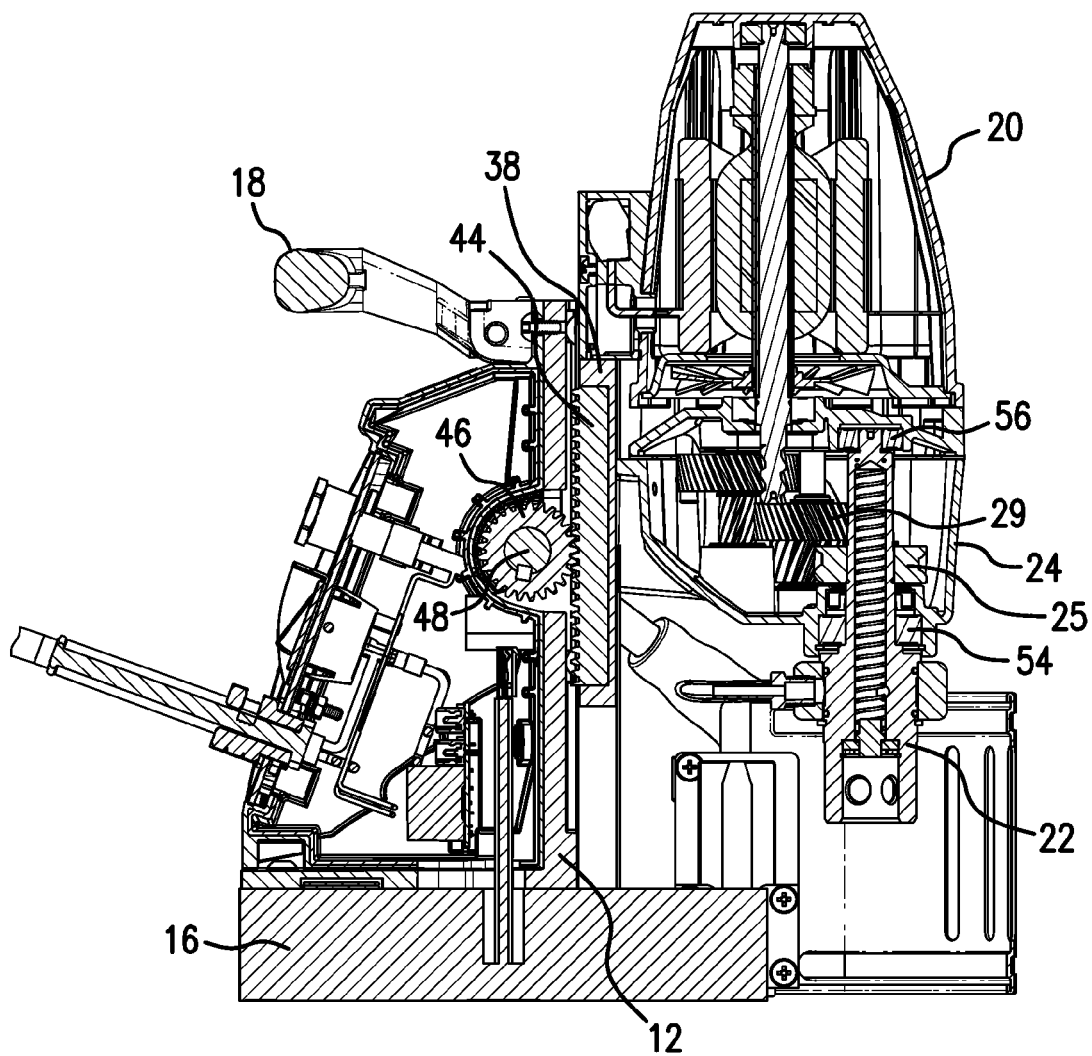
FIG. 3 is a cross sectional view of the drilling machine of FIG. 1 taken on the line B-B of FIG. 1

Gear housing 24 included in drill press 10 is fixed to a dovetail slide 38 supported by frame 12 for movement along the axis. FIG. 3 shows ball bearings 54 and 56, mounted in gear housing 24, which support the spindle assembly 22, so that spindle assembly 22 is rotatable relative to the gear housing 24, but constrained from lateral or axial movement relative to gear housing 24.

Figure 2:
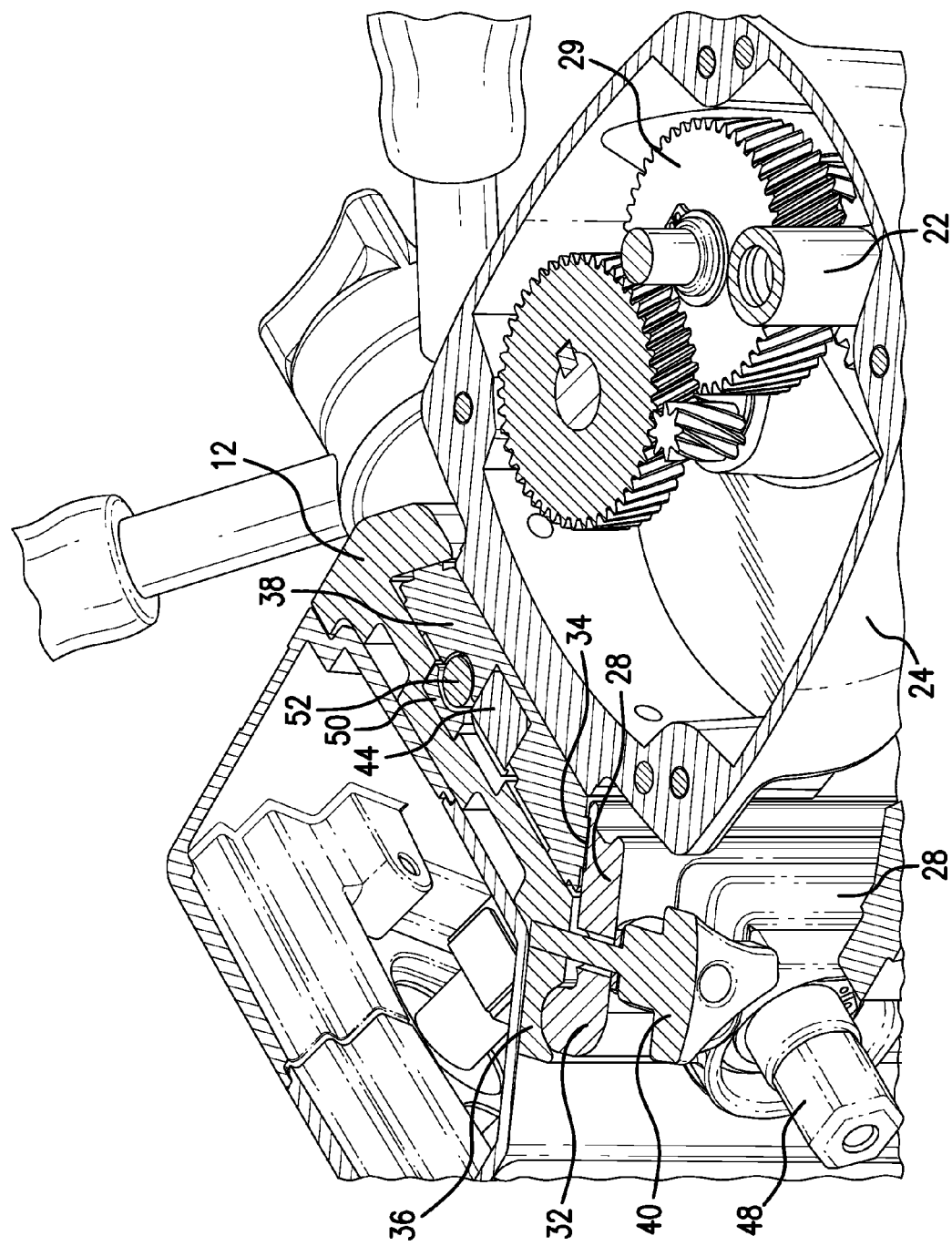
FIG. 2 is a cross sectional view of the drilling machine of FIG. 1 taken on the line A-A of FIG. 1.

Dovetail slide 38 moves on a rack and pinion gear assembly that includes a gear rack 44 and a corresponding gear pinion 46. FIGS. 2 and 3 shows gear rack 44 between frame 12 and dovetail slide 38. FIG. 3 shows gear pinion 46 positioned in frame 12. A feed shaft 48 extends from gear pinion 46 to the outside of drill 10 to allow for manual height adjustment of gear housing 24.

Figure 4:
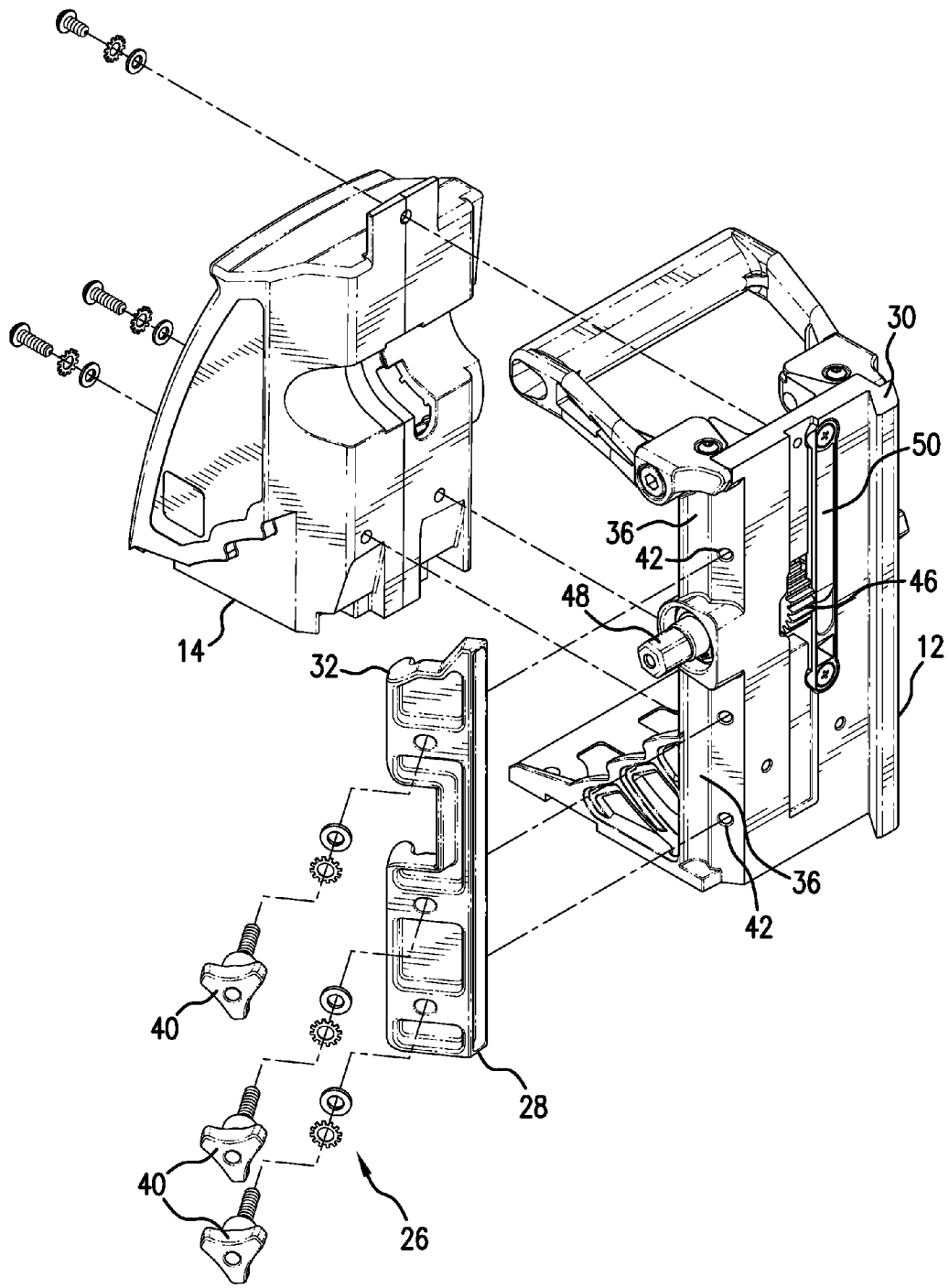
FIG. 4 is an exploded view of the frame, housing, and adjustable gib assembly for the drilling machine of FIG. 1.
Figure 5:
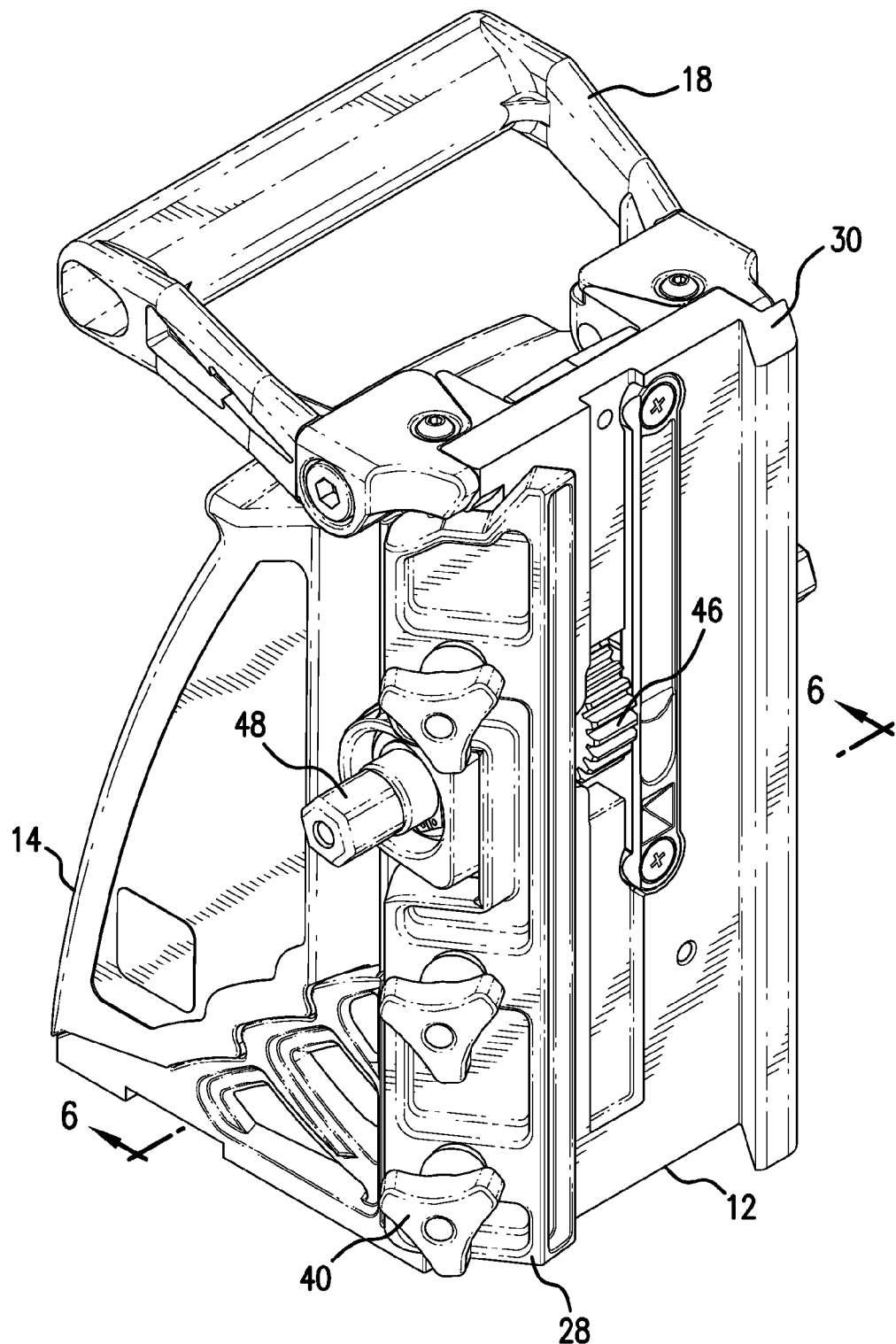
FIG. 5 shows an assembled view of the frame, housing, and adjustable gib assembly from FIG. 4.
Figure 6:
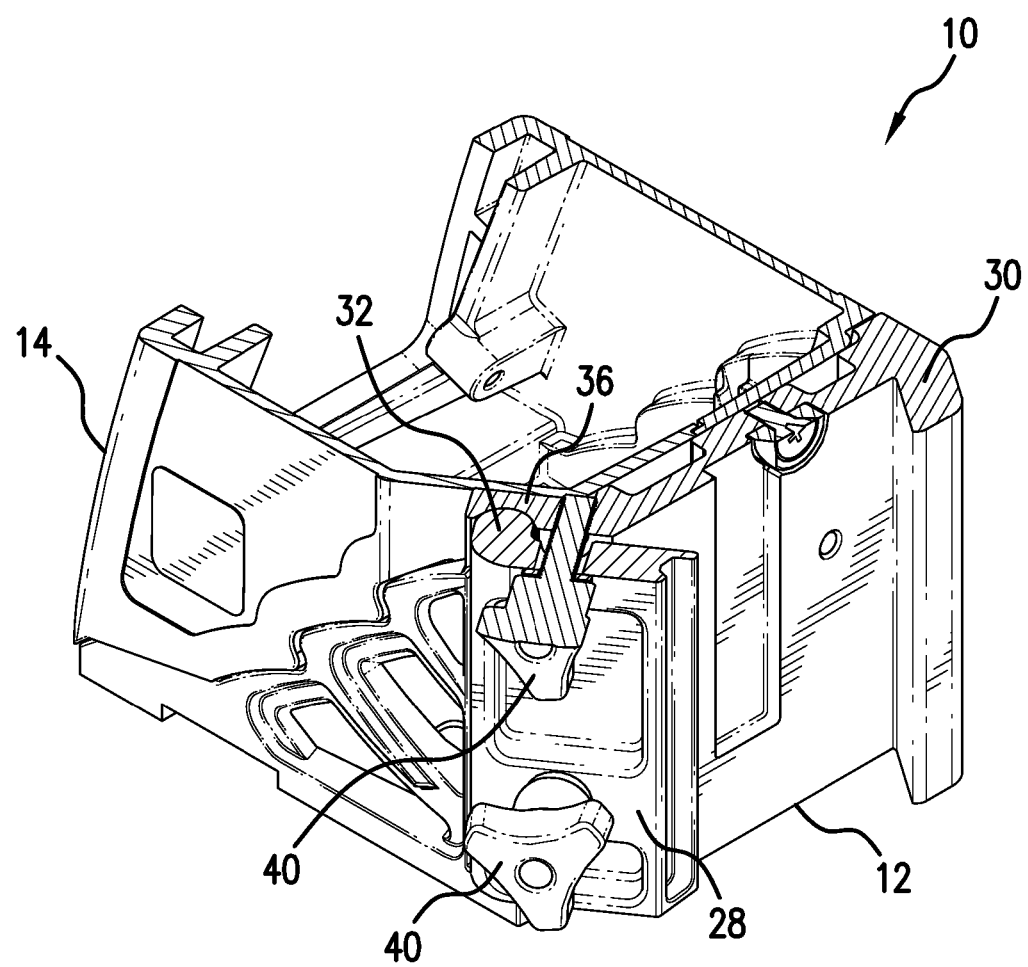
FIG. 6 is a cross sectional view of the assembled view of FIG. 5 taken on the line C-C of FIG. 5.
Figure 7:
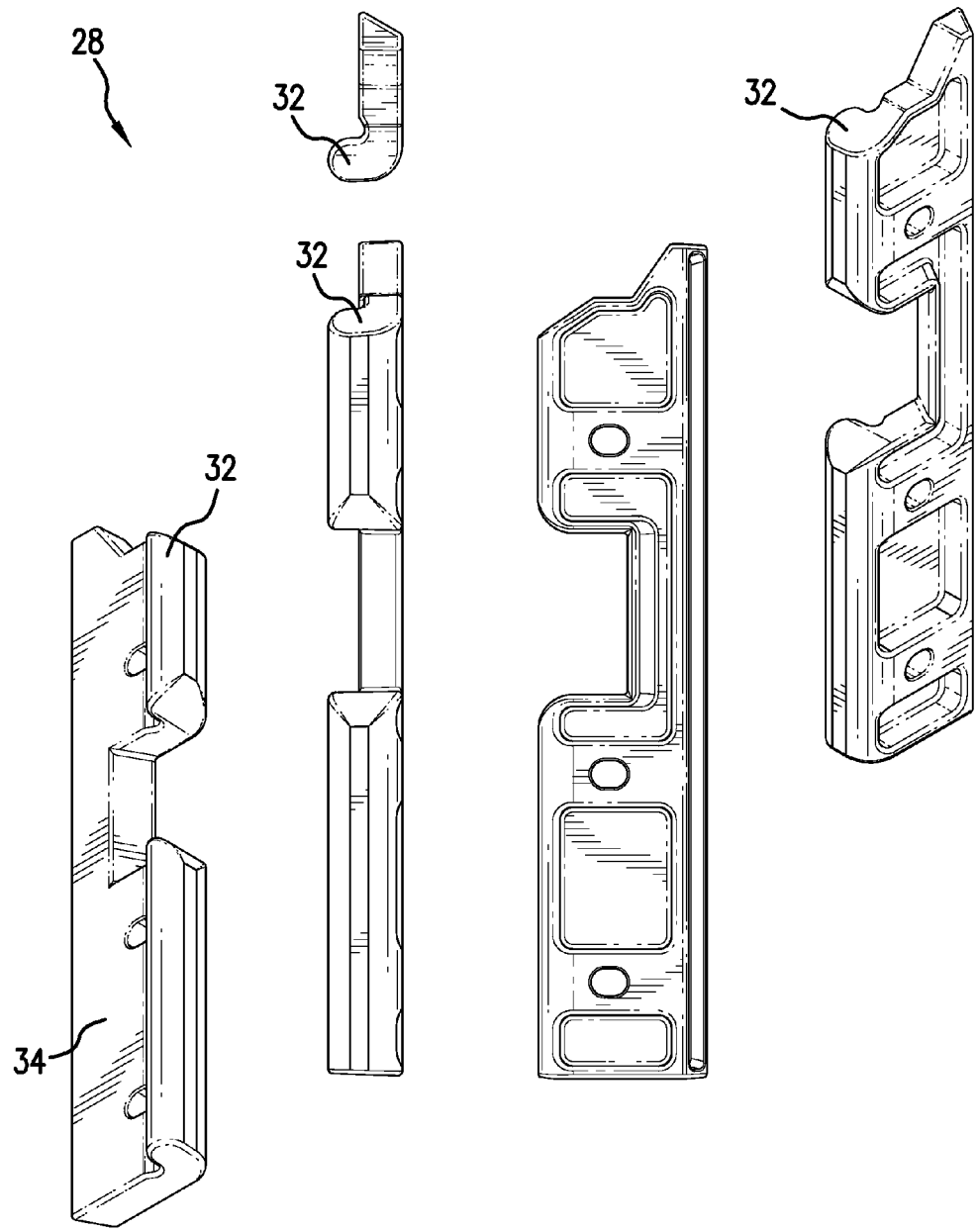
FIG. 7 is a detailed drawing of multiple views of the adjustable gib for the drilling machine shown in FIG. 1.

Dovetail slide 38 is guided for longitudinal movement relative to frame 12 on the gear assembly and by an adjustable gib assembly 26. Gib assembly 26 includes a pivoting gib 28, which pivots with respect to frame 12, and a fixed gib 30 integral with frame 12. FIG. 7 shows pivoting gib 28, which includes a pivoting post 32 and a smooth bearing surface 34 (labeled in FIG. 2). A rounded hinge 36 is formed in frame 12 to receive pivoting post 32 of pivoting gib 28, as shown in FIG. 4. Pivoting post 32 of pivoting gib 28 engages rounded hinge 36 of frame 12 and pivots with respect to frame 12.

Gear housing 24 is attached to dovetail slide 38 which is connected to frame 12 by adjustable gib assembly 26, as shown in FIG. 2. Adjustable gib assembly 26 provides smooth bearing surface 34 for slide 38 to guide gear housing 24's movement. Gib 28 of adjustable gib assembly 26 and fixed gib 30 of frame 12 presses against opposing sides of dovetail slide 38. Dovetail slide 38 and gibs 28 and 30 cooperate to prevent lateral movement of gear housing 24 and spindle assembly 22 transverse to the axis of the spindle assembly 22. Gibs 28 and 30 provide sufficient rigidity for proper drilling operation and retain dovetail slide 38 in position.

In situations where either excessive or insufficient pressure is exerted on dovetail slide 28 to provide for proper operation of the drill, pivoting gib 28 of adjustable gib assembly 26 is easily adjustable. Three threaded adjustment knobs 40 extend from the outside of pivoting gib 28 into threaded holes 42 in frame 12. This allows pivoting gib 28 to be tightened or loosened by threading or unthreading adjustment knobs 40, which adjusts tension on dovetail slide 38. Dovetail slide 38 can be manually manipulated as adjustment knobs 40 are adjusted until desired dovetail slide tension is achieved.

While the present invention has been particularly shown and described with reference to exemplary embodiments thereof, it should be understood by those of ordinary skill in the art that various changes, substitutions and alterations could be made herein without departing from the scope of the invention as defined by appended claims and their equivalents.

What is claimed is:

1. A power tool comprising:
a base for supporting the power tool on a surface;
a frame supported on the base;
a fixed gib attached to the frame;
a movable gib combined to the frame for movement with respect to the frame; and
a slide positioned for movement relative to the frame along an axis and constrained from lateral movement by the fixed gib on one side and the movable gib on another side.

2. The power tool of claim 1, and further comprising a motor assembly combined to the slide for movement relative to the frame along the axis and a spindle assembly combined to the motor assembly for movement with the motor assembly and for rotation about the axis.

3. The power tool of claim 1, wherein the movable gib further comprises a bearing surface for engagement with the slide.

4. The power tool of claim 3, wherein the movable gib further comprises a pivoting post, wherein the frame further comprises a rounded hinge, and wherein the pivoting post of the movable gib engages the rounded hinge of the frame for pivoting movement with respect to the frame.

5. The power tool of claim 4, wherein the fixed gib extends a sufficient length, and the movable gib extends the sufficient length to constrain the slide about its entire path of travel.

6. The power tool of claim 5, wherein the slide is a dove tail slide with a first side that faces the frame, a second side that is attached to a motor assembly, and a pair of lateral sides that are angled with respect to the first side and the second side, wherein one of the pair of lateral sides is engaged by the fixed gib and one of the pair of lateral sides is engaged by the movable gib.

7. The power tool of claim 6, and further comprising at least one adjustable fastener to connect the movable gib to the frame, wherein the adjustable fastener selectively adjusts a compression force that is applied to the movable gib and one of the pair of lateral sides of the dove tail slide that is engaged by the movable gib.

8. The power tool of claim 7, and further comprising a gear rack combined to the dove tail slide that is moved about the axis by a pinion gear.

9. The power tool of claim 8, and further comprising a cord channel extending between the dove tail slide and the frame that provides a path of travel for a motor cord.

10. A power tool comprising:
a base for supporting the power tool on a surface;
a frame supported on the base and including a track that extends longitudinally along the frame and a fixed gib attached to the frame and defining a first longitudinal side of the track;
a movable gib combined to the frame for movement with respect to the frame and defining a second longitudinal side of the track; and
a slide positioned for movement relative to the frame along an axis and constrained from lateral movement by the fixed gib and the movable gib.

11. The power tool of claim 10, and further comprising an adjustment fastener that combines the movable gib to the frame to selectively adjust a tension of the slide.

12. The power tool of claim 11, wherein the movable gib further comprises a bearing surface that engages the slide to provide a smooth path of travel for the slide.

13. The power tool of claim 12, wherein the movable gib pivots on an axis with respect to the frame and the slide.

14. The power tool of claim 10, wherein the movable gib moves with respect to the frame and to the slide.

15. A power tool comprising:
a base for supporting the power tool on a surface;
a frame supported on the base and including a track that extends longitudinally along the frame and a fixed gib attached to the frame and defining a first longitudinal side of the track;
a movable gib combined to the frame for movement with respect to the frame and defining a second longitudinal side of the track; and
a slide positioned for movement relative to the frame along an axis and constrained from lateral movement by the fixed gib and the movable gib, wherein the movable gib moves with respect to the slide.

16. The power tool of claim 15, and further comprising an adjustment fastener that combines the movable gib to the frame to selectively adjust a tension of the slide.

17. The power tool of claim 15, wherein the movable gib further comprises a bearing surface that engages the slide to provide a smooth path of travel for the slide.

18. The power tool of claim 15, and further comprising a gear rack combined to the slide that is moved about the axis by a pinion gear.

19. The power tool of claim 18, and further comprising a cord channel extending between the slide and the frame that provides a path of travel for a motor cord.

20. The power tool of claim 19, wherein the slide is a dove tail slide with a first side that faces the frame, a second side that is attached to a motor assembly, and a pair of lateral sides that are angled with respect to the first side and the second side, wherein one of the pair of lateral sides is engaged by the fixed gib and one of the pair of lateral sides is engaged by the movable gib.

\* \* \* \* \*